(12) United States Patent
Neyama

(10) Patent No.: US 9,714,836 B2
(45) Date of Patent: Jul. 25, 2017

(54) VEHICLE POSITION IDENTIFYING SYSTEM AND VEHICLE POSITION IDENTIFYING METHOD

(71) Applicant: TOYOTA JIDOSHA KABUSHIKI KAISHA, Toyota-shi, Aichi-ken (JP)

(72) Inventor: Ryo Neyama, Tokyo (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 15/031,961

(22) PCT Filed: Nov. 5, 2014

(86) PCT No.: PCT/IB2014/002437
§ 371 (c)(1),
(2) Date: Apr. 25, 2016

(87) PCT Pub. No.: WO2015/068030
PCT Pub. Date: May 14, 2015

(65) Prior Publication Data
US 2016/0265924 A1    Sep. 15, 2016

(30) Foreign Application Priority Data

Nov. 5, 2013 (JP) .................................. 2013-229330

(51) Int. Cl.
*G01C 21/00* (2006.01)
*G01C 21/34* (2006.01)
(Continued)

(52) U.S. Cl.
CPC .............. *G01C 21/34* (2013.01); *G01C 21/28* (2013.01); *G01C 21/30* (2013.01); *G01S 19/42* (2013.01); *G01S 19/49* (2013.01)

(58) Field of Classification Search
CPC ........ G01C 21/34; G01C 21/28; G01C 21/30; G01S 19/42; G01S 19/49
(Continued)

(56) References Cited

U.S. PATENT DOCUMENTS 6,018,697 A * 1/2000 Morimoto .............. G01C 21/34
340/988
2004/0267452 A1* 12/2004 Igarashi .................... G01S 7/22
701/300

FOREIGN PATENT DOCUMENTS

JP    03-027083 A    2/1991
JP    06-066919 A    3/1994
(Continued)

*Primary Examiner* — Gertrude Arthur Jeanglaude
(74) *Attorney, Agent, or Firm* — Sughrue Mion, PLLC

(57) ABSTRACT

Identifying a position of a vehicle using an absolute position coordinate based on radio navigation and a relative position coordinate based on at least vehicle speed. Setting, for traveling history information, reference sections in which a traveling area is common, and reading two absolute position coordinates concerning a same vehicle that are transmitted at different points in the reference section. Calculating distances between the two absolute position coordinates. A first distance is calculated based on the road map information. A second distance is calculated based on the vehicle speed included in the traveling history information. Selectively performing, according to an absolute value of a difference between the first and second distances, one of identification of the position using the absolute position coordinate, identification of the position using a vehicle speed integrated value, and identification of the position using both of the absolute position coordinate and the vehicle speed integrated value.

9 Claims, 12 Drawing Sheets

(51) Int. Cl.
*G01C 21/28* (2006.01)
*G01S 19/49* (2010.01)
*G01C 21/30* (2006.01)
*G01S 19/42* (2010.01)

(58) Field of Classification Search
USPC .......... 701/408, 409, 25, 424, 400; 340/435, 340/903
See application file for complete search history.

(56) References Cited

FOREIGN PATENT DOCUMENTS

| | | |
|---|---|---|
| JP | 08-334335 A | 12/1996 |
| JP | 2003-279362 A | 10/2003 |
| JP | 2008-039698 A | 2/2008 |
| JP | 2008-051572 A | 3/2008 |

* cited by examiner

| I1 | I2 | I3 | I4 | I5 | I6 |
|---|---|---|---|---|---|
| U1 :<br>FIRST<br>RANK | U2 | U3 :<br>SECOND<br>RANK | U4 | U5 :<br>THIRD<br>RANK | U6 |
| GPS IS<br>USED | GPS IS<br>NOT USED | GPS IS<br>USED | GPS IS<br>NOT USED | GPS IS<br>USED | GPS IS<br>NOT USED |

F I G . 10A
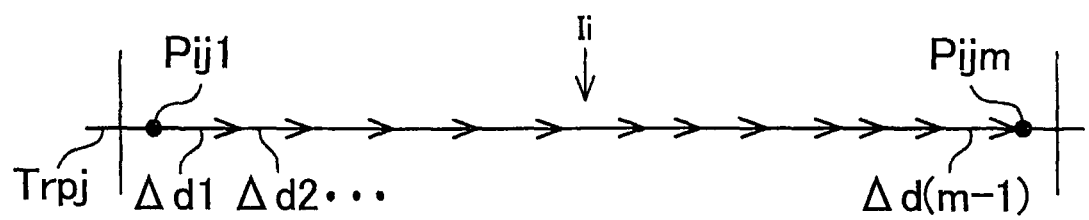
F I G . 10B
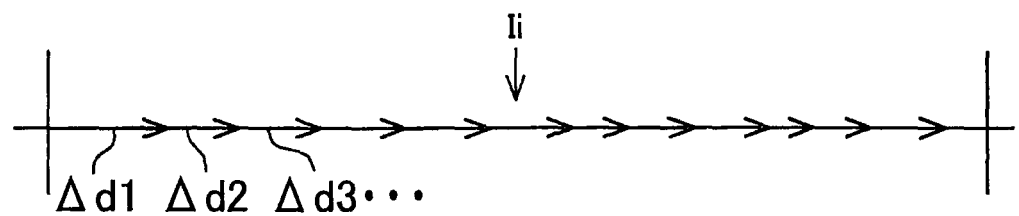

F I G . 14
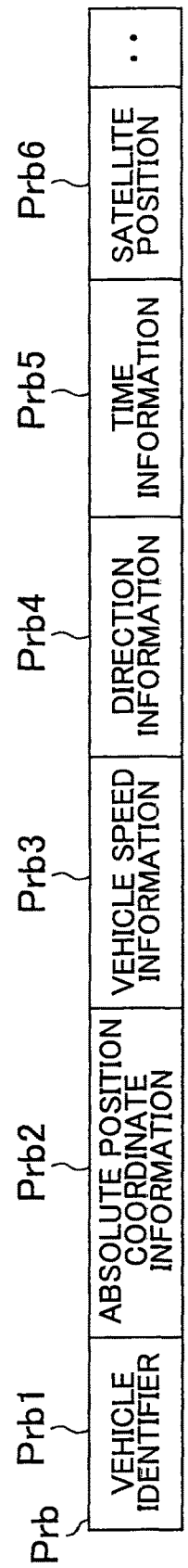

VEHICLE POSITION IDENTIFYING SYSTEM AND VEHICLE POSITION IDENTIFYING METHOD

BACKGROUND OF THE INVENTION

1. Field of the Invention

The invention relates to a vehicle position identifying system and a vehicle position identifying method.

2. Description of Related Art

As a method of identifying the position of a vehicle, there is available radio navigation using a global positioning system (GPS) and self-contained navigation using the speed and direction of the vehicle. In the radio navigation using the GPS, an absolute position coordinate including latitude and longitude is obtained as the position of the vehicle. In the self-contained navigation, by calculating a moving distance and a moving direction from a reference position using the vehicle speed and direction, a relative position coordinate from the reference position is obtained as the position of the vehicle. At present, both of these kinds of navigation are used for identification of the position of the vehicle.

Further, for the identification of the position of the vehicle, in addition to these kinds of navigation, for example, so-called map matching for matching a traveling track of the vehicle with the shape of a road indicated by road map information is also performed. In the map matching, when the traveling track does not match the road shape, accuracy of the position of the vehicle is improved by correcting the vehicle position to an appropriate position on the road.

On the other hand, in the radio navigation using the GPS, positioning accuracy is sometimes deteriorated because, for example, an error of about several meters to less than twenty meters occurs in the obtained absolute position coordinate or a reception state of a radio wave is deteriorated among high-rise buildings, in a mountain area, or the like. In the self-contained navigation, although an error per unit moving distance is smaller than a positioning error by the GPS, because of characteristics of the self-contained navigation, the error tends to accumulate. Therefore, the error increases as the traveling distance increases. In the map matching, although identification accuracy for the vehicle position can be improved at the time of a right turn, a left turn, or the like at an intersection, concerning position accuracy in the front back direction of the road, steady increase in identification accuracy of the vehicle position cannot be expected.

Therefore, in recent years, to make up for the disadvantages of these methods, there has also been proposed, for example, an apparatus that determines whether a moving distance of a vehicle from a reference position is within a positioning error range included in positioning data received from a GPS (see, for example, Japanese Patent Application Publication No. 8-334335 (JP 8-334335 A)). The apparatus calculates a relative position to the last host vehicle position using the self-contained navigation and obtains positioning data including absolute position information and positioning degree difference range information using the radio navigation. When the moving distance of the vehicle from the last vehicle position is within the positioning error range, the apparatus sets the calculated relative position as a host vehicle position. When the moving distance from the last host vehicle position is outside the positioning error range, the apparatus sets, as the host vehicle position, a position based on absolute position information obtained by the radio navigation.

Incidentally, as explained above, not only factors on the GPS side but also factors of a road environment in which the vehicle travels greatly contribute to the positioning error by the GPS. However, the positioning error range included in the positioning data does not take into account factors concerning a traveling environment of the vehicle such as the road environment. Therefore, even in the apparatus, there is still room for improvement concerning identification accuracy itself for the position of the vehicle.

SUMMARY OF THE INVENTION

The invention provides a vehicle position identifying system and a vehicle position identifying method that can further improve identification accuracy for the position of a vehicle.

A first aspect of the invention relates to a vehicle position identifying system that identifies the position of a vehicle using an absolute position coordinate based on radio navigation and a relative position coordinate based on at least vehicle speed. The vehicle position identifying system includes: a history information acquiring unit that acquires traveling history information including the absolute position coordinate and the vehicle speed from the vehicle; a section-for-reference generating unit that sets, for the acquired traveling history information, a section for reference in which a traveling area is common; a first distance calculating unit that reads two absolute position coordinates concerning the same vehicle that are transmitted at different points in the section for reference, and calculates a distance between the two absolute position coordinates as a first distance on the basis of road map information; a second distance calculating unit that reads the two absolute position coordinates and calculates the distance between the two absolute position coordinates as a second distance on the basis of the vehicle speed included in the traveling history information; and a position identifying unit that selectively performs, according to an absolute value of a difference between the first distance and the second distance, one of identification of the vehicle position using the absolute position coordinate based on the radio navigation, identification of the vehicle position using a vehicle speed integrated value, and identification of the vehicle position using both of the absolute position coordinate based on the radio navigation and the vehicle speed integrated value.

A second aspect of the invention relates to a vehicle position identifying method for identifying the position of a vehicle using an absolute position coordinate based on radio navigation and a relative position coordinate based on at least vehicle speed. The vehicle position identifying method includes: acquiring traveling history information including the absolute position coordinate and the vehicle speed from the vehicle; setting, for the acquired traveling history information, a section for reference in which a traveling area is common; reading two absolute position coordinates concerning the same vehicle that are transmitted at different points in the section for reference, and calculating a distance between the two absolute position coordinates as a first distance on the basis of road map information; reading the two absolute position coordinates and calculating the distance between the two absolute position coordinates as a second distance on the basis of the vehicle speed included in the traveling history information; and selectively performing, according to an absolute value of a difference between the first distance and the second distance, one of identification of the vehicle position using the absolute position coordinate based on the radio navigation, identification of the vehicle position using a vehicle speed integrated value, and identification of the vehicle position using both of the absolute position coordinate based on the radio navigation and the vehicle speed integrated value.

According to the aspects explained above, the absolute value of the difference between the first distance based on the radio navigation and the second distance based on the vehicle speed integrated value fluctuates according to positioning accuracy of the radio navigation in a traveling environment of the vehicle. For example, when the positioning accuracy of the radio navigation is low, the absolute value of the difference tends to be large. Therefore, by appropriately selecting, according to an absolute value of a difference calculated concerning the section for reference, a method of identification for the vehicle position in the section for reference, it is possible to exclude information that is a factor of an error of the vehicle position and perform identification of the vehicle position. Therefore, accuracy of the identified vehicle position is improved.

In the aspect, in the identification of the vehicle position using both of the absolute position coordinate based on the radio navigation and the vehicle speed integrated value, concerning the section for reference in which the absolute value of the difference between the first distance and the second distance is small, the position identifying unit may calculate a ratio of a vehicle speed integrated value calculated on the basis of the acquired traveling history information concerning at least a part of road sections in the section for reference and a distance calculated from the road map information concerning the road section, multiply a vehicle speed integrated value based on the traveling history information of a position identification target by the calculated ratio, and identify a vehicle position between the two absolute position coordinates.

According to the aspect, in the section for reference in which the absolute value of the difference between the first distance and the second distance is small, that is, the section for reference in which the positioning accuracy of the radio navigation is high, absolute position coordinates based on the radio navigation are interpolated by a relative moving distance based on the vehicle speed integrated value. In the calculation of the relative moving distance using the vehicle speed integrated value, the vehicle speed integrated value is multiplied by a ratio of the vehicle speed integrated value based on the traveling history information and the distance based on the road map information, whereby the relative moving distance based on the vehicle speed integrated value is normalized. Therefore, for example, even when a traveling track is different depending on a vehicle as in, for example, the section for reference in which a lane change is frequently performed or the section for reference near an intersection, it is possible to reduce the influence of a cumulative error included in the relative position coordinate.

In the aspect, the position identifying unit may identify the position of the vehicle by selecting, among absolute position coordinates detected at points in the section for reference in which the absolute value of the difference between the first distance and the second distance is small, absolute position coordinates closest to ends on both sides of the section for reference, and interpolating the absolute position coordinates with a relative moving distance obtained by multiplying the vehicle speed integrated value by the ratio.

According to the aspect, concerning the section for reference in which the absolute value of the difference between the first distance and the second distance is small, most of regions in the section for reference are interpolated by a normalized relative moving distance. Therefore, it is possible to improve, depending on setting of the length of the section for reference, accuracy of the identified vehicle position.

In the aspect, the vehicle position identifying system may further include a variance calculating unit that calculates, for each piece of the acquired traveling history information, the absolute value of the difference between the first distance and the second distance, and calculates, using absolute values of the differences respectively calculated from the acquired traveling history information, variance of the absolute values. The position of the vehicle may be identified using at least the absolute position coordinate concerning the section for reference in which the variance is small.

According to the aspect, for each piece of the traveling history information, the absolute value of the difference between the first distance and the second distance is calculated and the variance is calculated using the absolute values of the differences. Further, concerning the section for reference in which the variance is small, at least the identification of the vehicle position using the absolute position coordinate based on the radio navigation is performed. That is, it is possible to reduce the influence of an error due to a vehicle factor and an error due to, for example, a temporary failure of a radio reception state compared with when verification of the first distance and the second distance is performed using only one piece of traveling history information.

In the aspect, the section-for-reference generating unit may set a length of the section for reference to a length at which a distance including a cumulative error obtained when position identification is performed only by a relative moving distance based on the vehicle speed integrated value is within a positioning error range on a positioning system side using the radio navigation.

According to the aspect, even when the position of the vehicle is identified using on the relative moving distance based on the vehicle speed integrated value, a distance including a cumulative error of the position does not exceed a positioning error range of a radio positioning system itself. That is, in the section for reference, an error of the position of the vehicle identified using only the relative moving distance based on the vehicle speed integrated value can be set smaller than an error of the position of the vehicle identified by only the radio navigation. Therefore, when the positioning accuracy of the radio navigation is low, it is possible to reduce the error of the vehicle position by identifying the position of the vehicle using only the vehicle speed integrated value.

In the aspect, concerning the section for reference in which the absolute value of the difference between the first distance and the second distance is large, the position identifying unit may identify the vehicle position using only a relative moving distance based on the vehicle speed integrated value.

According to the aspect, in the section for reference in which the absolute value of the difference between the first distance and the second distance is large, the vehicle position is calculated according to only the relative moving distance based on the vehicle speed integrated value. Therefore, when the positioning accuracy of the absolute position coordinate is low, it is possible to exclude information that is a factor of an error of the vehicle position and perform identification of the vehicle position. Therefore, accuracy of the identified vehicle position is improved.

In the aspect, the first distance calculating unit may select, among absolute position coordinates detected at points in the section for reference, absolute position coordinates closest to ends on both sides of the section for reference, match the selected absolute position coordinates with positions on a road on the basis of the road map information, and calculate a distance between the matched positions as the first distance along a road shape included in the road map information.

According to the aspect, the first distance is calculated along the road shape. Therefore, it is possible to set the first distance close to a distance of an actual road.

In the aspect, the history information acquiring unit, the section-for-reference generating unit, the first distance calculating unit, the second distance calculating unit, and the position identifying unit may be provided in an information collecting apparatus that configures a probe car system and collects probe information.

According to the aspect, with the information collecting apparatus, the position of the vehicle traveling on a road can be identified by the method explained above. Therefore, it is possible to generate accurate traffic guidance information or the like using a large-scale apparatus group.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 7A and 7B are diagrams for explaining a first distance calculated concerning the section for reference, wherein FIG. 7A is a conceptual diagram of an observation section set for calculating the first distance and FIG. 7B is a conceptual diagram calculated concerning the observation section;

FIGS. 10A and 10B are diagrams for explaining methods of identifying a vehicle position, wherein FIG. 10A is a conceptual diagram for explaining a method of identifying the vehicle position using an absolute position coordinate and a relative moving distance and FIG. 10B is a conceptual diagram for explaining a method of identifying the vehicle position using only the relative moving distance;

FIG. 14 is a schematic diagram for explaining a data configuration of probe information in a modification.

DETAILED DESCRIPTION OF EMBODIMENTS (First Embodiment)

A first embodiment embodying a vehicle position identifying system and a vehicle position identifying method is explained below.

In this embodiment, the vehicle position identifying system is explained while being embodies in a probe car system that collects, as probe information, traveling history information generated by a vehicle and identifies the position of the vehicle on the basis of the collected probe information. Note that this system identifies the position of the vehicle, which transmits the probe information, and then generates assist information such as route guidance information and road guidance information on the basis of a driving history and a traveling history included in the probe information and the assist information to the vehicle on a road.

Figure 1:
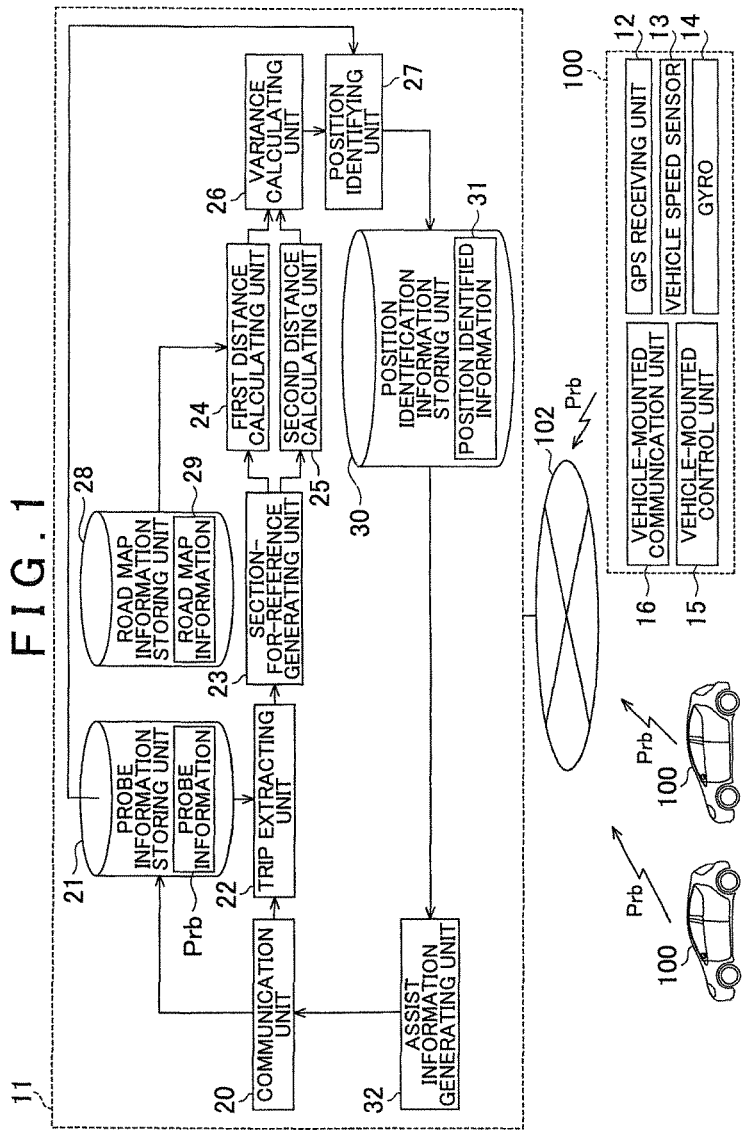
FIG. 1 is a block diagram showing, concerning a first embodiment of a vehicle identifying system and a vehicle identifying method according to the invention, the schematic configurations of a position identifying apparatus and a vehicle that configure the vehicle identifying system.

As shown in FIG. 1, the vehicle position identifying system is configured by vehicles 100 that generate and transmit probe information Prb and a position identifying apparatus 11 functioning as an information collecting apparatus. The position identifying apparatus 11 is connected to the vehicles 100 via a network 102 including a base station that receives the probe information Prb by radio communication.

The vehicle 100 includes a GPS receiving unit 12, a vehicle speed sensor 13, a gyro 14, a vehicle-mounted control unit 15, and a vehicle-mounted communication unit 16. The GPS receiving unit 12 outputs a signal based on a radio wave received from a GPS satellite to the vehicle-mounted control unit 15. The vehicle-mounted control unit 15 calculates latitude and longitude of a host vehicle position as an absolute position coordinate on the basis of the signal input from the GPS receiving unit 12.

The vehicle-mounted control unit 15 calculates vehicle speed on the basis of a wheel speed pulse output from the vehicle speed sensor 13. The vehicle-mounted control unit 15 calculates a change amount of the direction of the host vehicle from a reference position on the basis of a signal indicating a yaw rate output from the gyro 14. The vehicle-mounted control unit 15 calculates a relative moving distance $\Delta d$ obtained by integrating the vehicle speed with time and the change amount of the direction and calculates, on the basis of the relative moving distance $\Delta d$ and the change amount of the direction, a relative position coordinate with respect to the immediately preceding vehicle position already calculated. The vehicle-mounted control unit 15 transmits, via the vehicle-mounted communication unit 16, the probe information Prb indicating a traveling history of the host vehicle to the position identifying apparatus 11.

Figure 2:
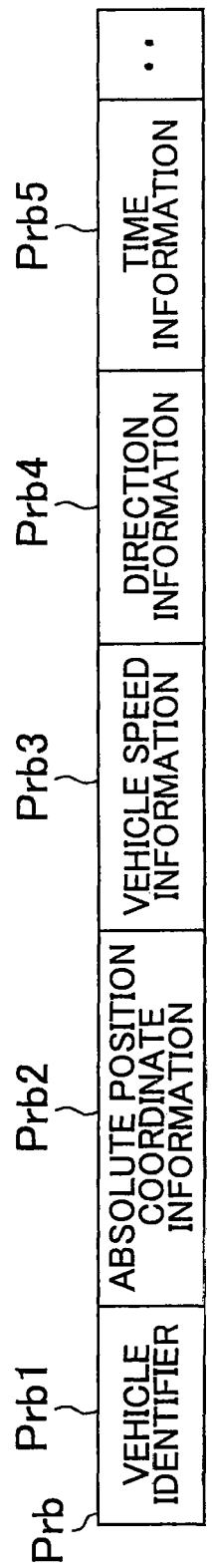
FIG. 2 is a schematic diagram for explaining a data configuration of probe information transmitted from the vehicle.

As shown in FIG. 2, the probe information Prb includes a vehicle identifier Prb1, absolute position coordinate information Prb2, vehicle speed information Prb3, direction information Prb4, and time information Prb5. The vehicle identifier Prb1 is an identifier for identifying a transmission source vehicle on the position identifying apparatus 11 side. The absolute position coordinate information Prb2 indicates a coordinate calculated by the vehicle-mounted control unit 15 using the radio navigation on the basis of an input signal from the GPS receiving unit 12. The vehicle speed information Prb3, the direction information Prb4, and the time information Prb5 indicate vehicle speed, a direction, and time calculated or detected by the transmission source vehicle 100. The probe information Prb may include a steering angle, presence or absence of stepping of a brake pedal, a driving history such as ON/OFF information of a direction indicator, and a traveling history such as acceleration and deceleration.

Figure 3:
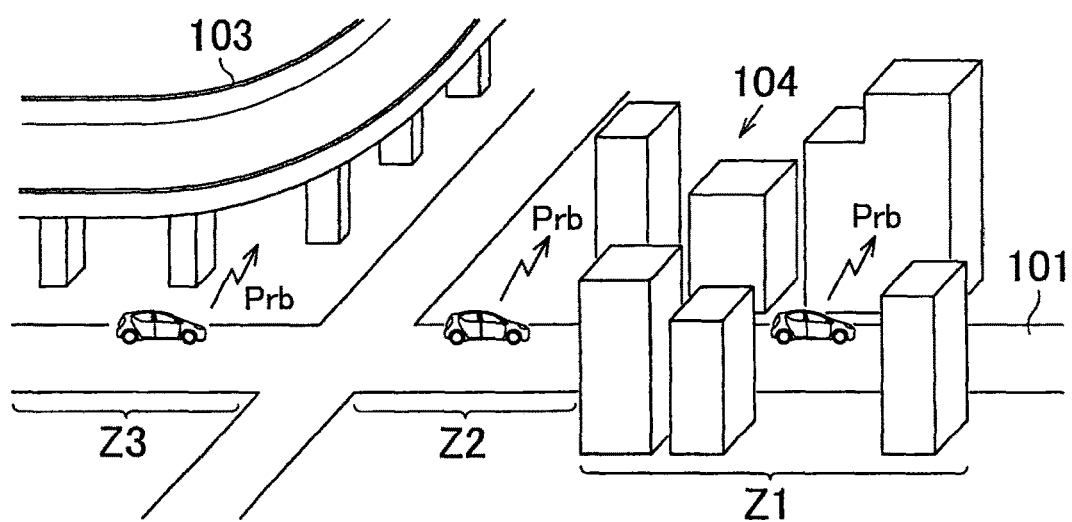
FIG. 3 is a schematic diagram for explaining a traveling environment of the vehicle that transmits the probe information and a radio reception state corresponding to the traveling environment.

Incidentally, as shown in FIG. 3, a radio wave reception state from a GPS satellite in the vehicle 100 fluctuates according to a traveling environment of the vehicle 100. For example, on a road 101 in a high-rise building group 104 in an area Z1, multiple wave propagation (multi-path) occurs in which a radio wave of a GPS is reflected on buildings and the like and propagated through a plurality of radio wave paths. A positioning error of the GPS sometimes increases. When the vehicle 100 travels on a road under an elevated road 103 in an area Z3, a road with a large number of obstacles for a radio wave such as trees, a road in a mountainous area, or the like, it is likely that a GPS reception state is deteriorated and the multi-path occurs as in the area Z1. In addition, the accuracy of the GPS satellite itself is temporarily deteriorated. On the other hand, in an area Z2 where the accuracy of the GPS satellite is in a normal satisfactory state and no obstacle for a radio wave is present near the road, GPS positioning accuracy is relatively high. That is, while the vehicle 100 travels on the road 101, the GPS positioning accuracy fluctuates according to a traveling environment of the vehicle 100.

Therefore, concerning an event that requires guidance for another vehicle such as a vehicle parking on a road, a disabled vehicle, or the like, for example, near the area Z1 where the positioning accuracy is low, when assist for notifying guidance is performed targeting a vehicle around a point where the event occurs, it is necessary to accurately identify, on the basis of the probe information Prb, a position where the event occurs. When the accuracy of the identification is low, accurate information sometimes cannot be transmitted. For example, information indicating an incorrect event occurrence point is transmitted. Therefore, the position identifying apparatus 11 verifies accuracy of the absolute position coordinate information Prb2 included in the probe information Prb and selects, on the basis of a result of the verification, a method suitable for the verification result and performs identification of a vehicle position.

As shown in FIG. 1, the position identifying apparatus 11 includes a communication unit 20 functioning as a history-information acquiring unit and a probe information storing unit 21. When receiving the probe information Prb via the communication unit 20, the position identifying apparatus 11 stores the received probe information Prb in the probe information storing unit 21.

The position identifying apparatus 11 includes a trip extracting unit 22, a section-for-reference generating unit 23, a first distance calculating unit 24, a second distance calculating unit 25, and a variance calculating unit 26. These units verify the accuracy of the absolute position coordinate information Prb2 in offline processing. The position identifying apparatus 11 includes a road map information storing unit 28 that stores road map information 29 used for the verification.

The trip extracting unit 22 reads, out of the accumulated probe information Prb, the probe information Prb generated under a common condition. For example, the trip extracting unit 22 reads the probe information Prb generated in a predetermined traveling area of an expressway or a trunk road, the probe information Prb generated in a specific period of time in the predetermined area, and the like. Among the pieces of read probe information Prb, the trip extracting unit 22 sets, as one piece of trip information Trp, a plurality of pieces of probe information Prb, which are transmitted from one vehicle 100, in the order of the transmission in time series.

For example, as shown in FIG. 3, when the vehicle 100 serving as a transmission source of the probe information Prb travels in a predetermined road section on the road 101, the vehicle 100 transmits a plurality of pieces of probe information Prb during the traveling. The trip extracting unit 22 treats, as one piece of trip information Trp, the probe information Prb transmitted in the area Z3, the probe information Prb transmitted in the area Z2, the probe information Prb transmitted in the area Z1, and the like. That is, when the read probe information Prb includes, only information transmitted from one vehicle 100, the trip information Trp for one vehicle is generated. When the read probe information Prb includes information transmitted from a plurality of vehicles 100, the trip information Trp for the number of vehicles is generated. Note that, when only one piece of trip information Trp is generated, the probe information Prb may be read again under a changed condition.

The section-for-reference generating unit 23 generates a section for reference Ii on the basis of the trip information Trp. The section for reference Ii is a section for verifying the accuracy of the absolute position coordinate information Prb2 in the section. The section for reference Ii is also used as a section in which identification of a vehicle position using an absolute position coordinate based on the absolute position coordinate information Prb2 and the relative moving distance Δd based on a vehicle speed integrated value and identification of a vehicle position using only the relative moving distance Δd are selectively performed according to a result of the verification.

Figure 4:
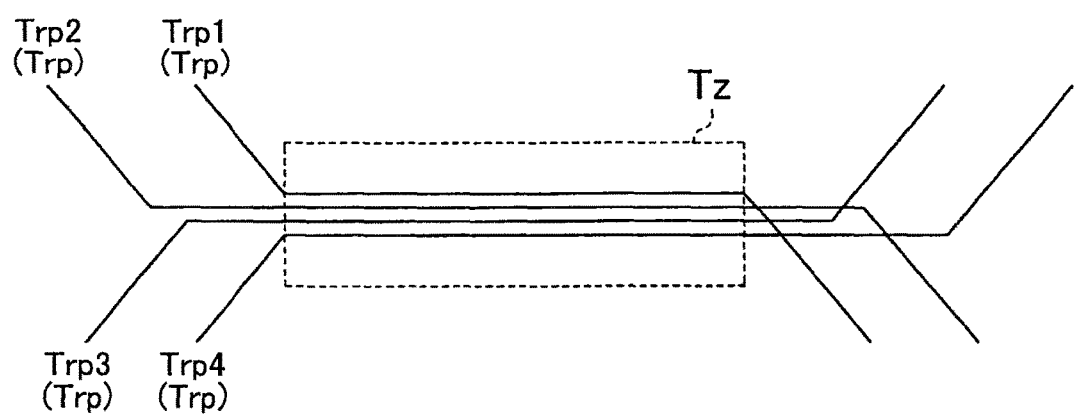
FIG. 4 is a conceptual, diagram for explaining trips and common sections set for the trips in a part of offline processing performed by a position identifying apparatus.

A method of setting a section for reference is explained with reference to FIGS. 4 to 6. As shown in FIG. 4, first, the section-for-reference generating unit 23 reads the trip information Trp acquired by the trip extracting unit 22 and sets a common section Tz of the trip information Trp. Note that, in FIG. 4, traveling routes represented by the trip information Trp are schematically shown.

The common section Tz is a traveling section common to traveling routes represented by those pieces of trip information Trp. When the collected trip information Trp is little, if the common section Tz is set such that the entire common section Tz from a start end to a terminal end is included in the trip information Trp, it is likely that the common section Tz cannot be set or a set common section is extremely short. Therefore, the traveling routes represented by the trip information Trp do not always need to include the entire common section Tz and only have to include at least a part of the common section Tz.

Figure 5:
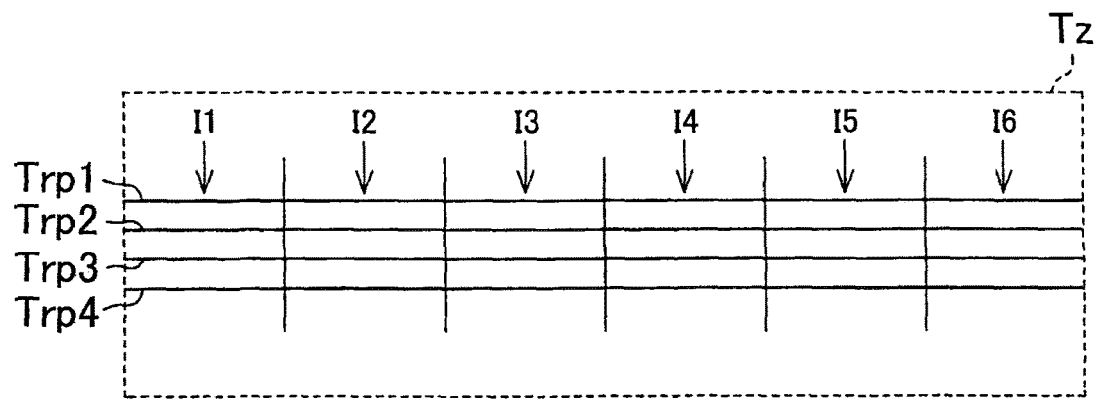
FIG. 5 is a conceptual diagram for explaining a method of setting a section for reference in a part of the offline processing performed by the position identifying apparatus.

As shown in FIG. 5, after setting the common section Tz, the section-for-reference generating unit 23 divides the common section Tz into sections for reference Ii. Basically, the section-for-reference generating unit 23 divides the common section Tz into a plurality of sections for reference Ii. However, when the common section Tz is short, the section-for-reference generating unit 23 may set the common section Tz as one section for reference Ii. The section for references Ii may be equally divided or may be unequally divided. The length of the sections for reference Ii may be varied according to a traveling environment such as the periphery of an intersection or an urban area.

The section-for-reference generating unit 23 sets the length of the sections for reference Ii to length equal to or smaller than a maximum length Lmax set in advance. That is, since an error of a vehicle speed integrated value is accumulated as a distance increases, when an error that could occur per unit length of a relative moving distance based on the vehicle speed integrated value is represented as α, a distance is sometimes calculated as "distance αL" at the maximum, although a distance that the vehicle 100 actually travels is "distance L".

On the other hand, as explained above, in the sections for reference Ii, it is also likely that a vehicle position is identified using only the relative moving distance Δd. Only concerning a section in which a traveling distance is short, there is an advantage that the vehicle position calculated on the basis of the relative moving distance Δd has an error smaller than an error of an absolute position coordinate by a GPS. However, as explained above, the error is accumulated as the traveling distance increases.

Therefore, when the distance "αL" including the cumulative error exceeds a diameter 2ε of a positioning range error Eg of the GPS, the cumulative error exceeds the positioning range error Eg of the GPS. In this case, if the vehicle position is identified by only a relative moving distance when positioning accuracy of the absolute position coordinate is low, there is no advantage of not using the absolute position coordinate.

Figure 6:
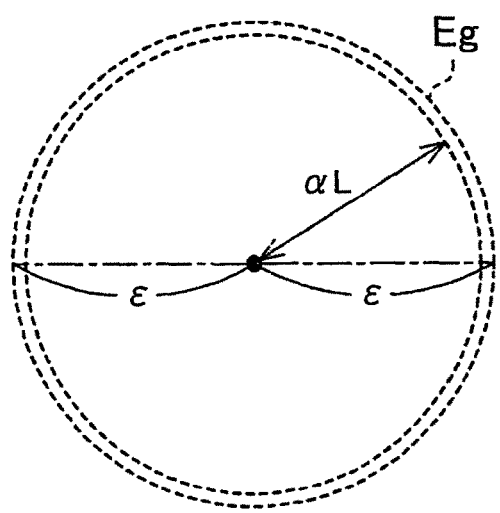
FIG. 6 is a conceptual diagram for explaining a maximum length of the section for reference.

That is, as shown in FIG. 6, it is preferable that the distance "αL" including the cumulative error is equal to or smaller than the diameter 2ε of the positioning range error Eg of the GPS. Therefore, as indicated by the following Expression (1), a distance at which the distance "αL" including the cumulative error is equal to the diameter 2ε of the positioning range error Eg of the GPS is represented as maximum length Lmax of the sections for reference Ii.

$$L_{max} = \frac{2\varepsilon}{\alpha} \quad (1)$$

where $$2\varepsilon = \alpha L$$

A method of calculation by the first distance calculating unit 24 and the second distance calculating unit 25 is explained. The first distance calculating unit 24 and the second distance calculating unit 25 calculate, for each piece of the trip information Trpj, a first distance LAj and a second distance LBj for verifying the accuracy of the absolute position coordinate.

Figures 7A, 7B:
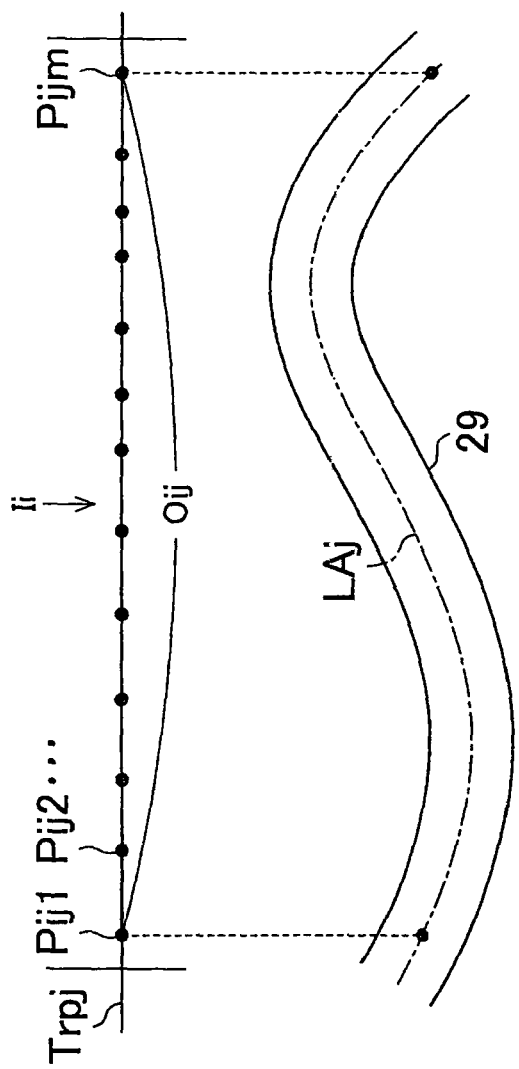

As shown in FIG. 7A, the first distance calculating unit 24 acquires one piece of trip information Trpj (j=1, 2, . . . , and n) among n pieces of trip information Trp1 to Trpn including the sections for reference Ii and reads the absolute position coordinate information Prb2 of the probe information Prb included in the trip information Trpj. The first distance calculating unit 24 acquires absolute position coordinates Pijk (k=1, 2, . . . , and m) close to the ends of the sections for reference Ii among absolute position coordinates Pijk (Pij1, Pij2, . . . , and Pijm) based on the read absolute position coordinate information Prb2. In an example shown in FIG. 7A, the first distance calculating unit 24 acquires the absolute position coordinates PO and Pijm. The first distance calculating unit 24 sets an observation section Oij having the acquired absolute position coordinates Pij1 and Pijm as both ends. Note that, when the pieces of trip information Trpj are explained without being distinguished from one another, the trip information Trpj is simply explained as trip information Trp. When the absolute position coordinates Pijk included in the sections for reference Ii of one piece of trip information Trpj is explained without being distinguished from one another, the absolute position coordinate Pijk is also simply explained as the absolute position coordinate Pij.

As shown in FIG. 7B, the first distance calculating unit 24 reads the road map information 29 corresponding to the observation section Oij from the road map information storing unit 28, acquires information concerning a road shape of the observation section Oij in the road map information 29, and calculates a distance of the observation section Oij along the road shape. The road map information 29 includes, for example, nodes indicating absolute position coordinates and shape interpolation points set among the nodes. The first distance calculating unit 24 accumulates distances among the shape interpolation points to calculate a distance. In this case, the first distance calculating unit 24 matches the absolute position coordinates Pij1 and Pijm with positions on a road using the absolute position coordinates Pij1 and Pijm and a traveling track based on the vehicle speed information Prb3 and the direction information Prb4 included in the probe information Prb. Further, the first distance calculating unit 24 calculates, on the basis of the nodes and the shape interpolation points between the absolute position coordinates Pij1 and Pijm matched with the positions on the road a distance between the absolute position coordinates Pij1 and Pijm as a first distance LAj.

A calculation method for a second distance by the second distance calculating unit 25 is explained with reference to FIG. 8. The second distance calculating unit 25 reads the absolute position coordinates Pijk included in the sections for reference Ii in the acquired trip information Trpj and the vehicle speed information Prb3 and the time information Prb5 transmitted together with the absolute position coordinate Pijk. The second distance calculating unit 25 calculates a relative moving distance Δdk obtained by integrating vehicle speed V, which is a value of the vehicle speed information Prb3, using time based on the time information Prb5. The second distance calculating unit 25 sets, as a second distance LBj, a distance obtained by adding up the relative moving distances Δd1, Δd2, . . . , and Δd(m−1).

The variance calculating unit 26 reads the first distance LAj calculated by the first distance calculating unit 24 and the second distance LBj calculated by the second distance calculating unit 25. As indicated by the following Expression (2), the variance calculating unit 26 calculates, as a difference absolute value Dij, an absolute value of a difference between the first distance LAj and the second distance LBj.

$$D_{ij} = |LA_j - LB_j| \quad (2)$$

Similarly, the first distance calculating unit 24 and the second distance calculating unit 25 calculate difference absolute values Dij (Di1, Di2, . . . , and Din) for each piece of the trip information Trpj including the sections for reference Ii. After the difference absolute values Dij are calculated for all the pieces of trip information Trpj including the sections for reference Ii, the variance calculating unit 26 calculates, using the difference absolute values Dij, a variance Ui (unbiased variance) of the difference absolute values Dij as indicated by Expression (3).

$$U_i^2 = \frac{1}{n-1} \sum_{j=1}^{n} (\overline{D_{ij}} - D_{ij})^2 \qquad (3)$$

Similarly, the variance calculating unit 26 calculates the variances Ui for all the target sections for reference Ii. After calculating the variances. Ui for all the sections for reference Ii (U1, U2, U3, . . . ), the variance calculating unit 26 makes it possible to distinguish the sections for reference Ii associated with the variances Ui and then sorts the variances Ui in order from the variance Ui having the smallest value and performs ranking of the variances Ui.

Figures 8, 9:
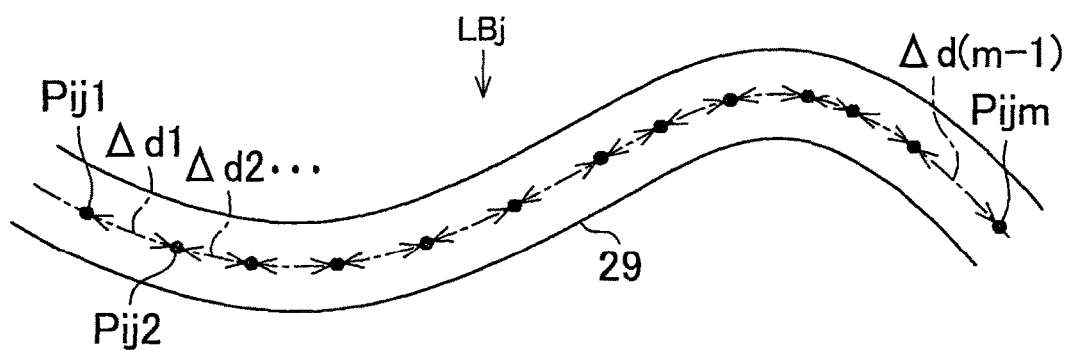
FIG. 8 is a conceptual diagram for explaining a second distance calculated concerning the section for reference.
FIG. 9 is a conceptual diagram for explaining a selection example of a method of identifying vehicle positions concerning a plurality of sections for reference.

In an example shown in FIG. 9, a variance U1 of a section for reference I1 is the smallest and is first in the rank. A variance U3 of a section for reference I3 is the second smallest and second in the rank. A variance U5 of a section for reference I5 is the third smallest and is third in the rank.

As shown in FIG. 1, the position identifying apparatus 11 includes a position identifying unit 27 and a position identification information storing unit 30 that stores position identified information 31. The position identifying unit 27 performs, using the ranking calculated in the offline processing in this way, for each piece of the trip information Trp, identification of the position of the vehicle that transmits the trip information Trp.

An assist information generating unit 32 provided in the position identifying apparatus 11 generates, on the basis of the vehicle position identified by the position identifying unit 27 and the driving history and the traveling history included in the probe information Prb, assist information to be transmitted to the vehicle 100 traveling around an assist target section or point and transmits the generated assist information to the assist target vehicle 100 via the communication unit 20.

The position identifying unit 27 selects, on the basis of the ranking, concerning the sections for reference Ii in high ranks up to a rank set in advance, a method of performing identification of a vehicle position using the absolute position coordinate and the relative moving distance Δd. The position identifying unit 27 selects, concerning the other sections for reference Ii in low ranks, a method of performing identification of a vehicle position using the relative moving distance Δd based on the vehicle speed integrated value.

In the example shown in FIG. 9, the section for reference I1 in the first rank, the section for reference I3 in the second rank, and the section for reference I5 in the third rank are set as sections in which the GPS is used, that is, sections in which identification of a vehicle position is performed using the absolute position coordinate and the relative moving distance Δd. The other sections for reference I2, I4, and the like are set as sections in which the GPS is not used, that is, sections in which identification of a vehicle position is performed using the relative moving distance Δd.

When identifying a vehicle position using the absolute position coordinate and the relative moving distance Δd, first, the position identifying unit 27 reads one piece of trip information Trp1. The trip information Trp is a probe information group continuously transmitted from one vehicle 100.

As shown in FIG. 10A, the position identifying unit 27 calculates the absolute position coordinates Pij1 and Pijm closest to both ends of the sections for reference Ii among the absolute position coordinates Pijk (Pij1, Pij2, . . . , and Pijm) corresponding to the absolute position coordinate information Prb2 included in the read probe information Prb. Further, the position identifying unit 27 acquires the vehicle speed information Prb3 included in the probe information Prb transmitted between the absolute position coordinates PO and Pijm and interpolates the absolute position coordinates Pij1 and Pijm using the relative moving distance Δd (Δd1, Δd2, . . . , and Δd(m−1) based on a value obtained by integrating the vehicle speed V based on the acquired vehicle speed information Prb3.

In this case, the position identifying unit 27 calculates, in any section in the sections for reference Ii, for each piece of the trip information Trpj, a theoretical distance Lmp along the road shape calculated on the basis of the road map information 29 and a relative moving distance Lv based on an integrated value of the vehicle speed information Prb3 included in the trip information Trpj. The vehicle position identifying unit 27 calculates, for each piece of the trip information Trpj, a ratio kj of the theoretical distance Lmp and the relative moving distance Lv (=Lmp/Lv). Further, the vehicle position identifying unit 27 calculates, as a ratio K, an average of ratios kj of those pieces of trip information Trpj, a median of the ratios kj, or the like.

The position identifying unit 27 multiplies the relative moving distance Δd for interpolating the absolute position coordinates Pij1 and Pijm by the ratio K to thereby normalize the relative moving distance Δd. That is, in a section in which a lane change is frequently performed or a section near an intersection, an actual traveling distance is difference depending on the vehicle 100. Therefore, for example, in the section in which a lane change is frequently performed, an actual traveling distance tends to be long compared with the length of a road along a traveling direction. In such a section, the ratio K calculated using the trip information Trp is equal to or smaller than "1". The relative moving distance Δd is corrected to be small by being multiplied by the ratio K.

Therefore, in the sections for reference Ii in which an actual traveling distance tends to be larger than the theoretical distance Lmp, by using a normalized relative moving distance Δd', a vehicle position identified on the basis of the relative moving distance Δd' is brought close to an actual vehicle position. Note that vehicle positions between the absolute position coordinates Pij1 and Pijm and the ends of the sections for reference Ii can also be identified on the basis of the normalized relative moving distance Δd'. The information including the vehicle position identified in this way and a history of traveling is stored in the position identification information storing unit 30 as the position identified information 31.

As shown in FIG. 10B, when identifying a vehicle position using the relative moving distance Δd, the position identifying unit 27 reads a plurality of pieces of probe information Prb transmitted from one vehicle 100 in the sections for reference Ii. The position identifying unit 27 integrates, with time, the vehicle speed V indicated by the vehicle speed information Prb3 included in the probe information Prb, calculates the relative moving distances Δd, and adds up the relative moving distances Δd from a reference position along the traveling direction of the road to relatively identify a vehicle position. Information including the vehicle position identified in this way and a history of traveling is stored in the position identification information storing unit 30 as the position identified information 31.

Figure 11:
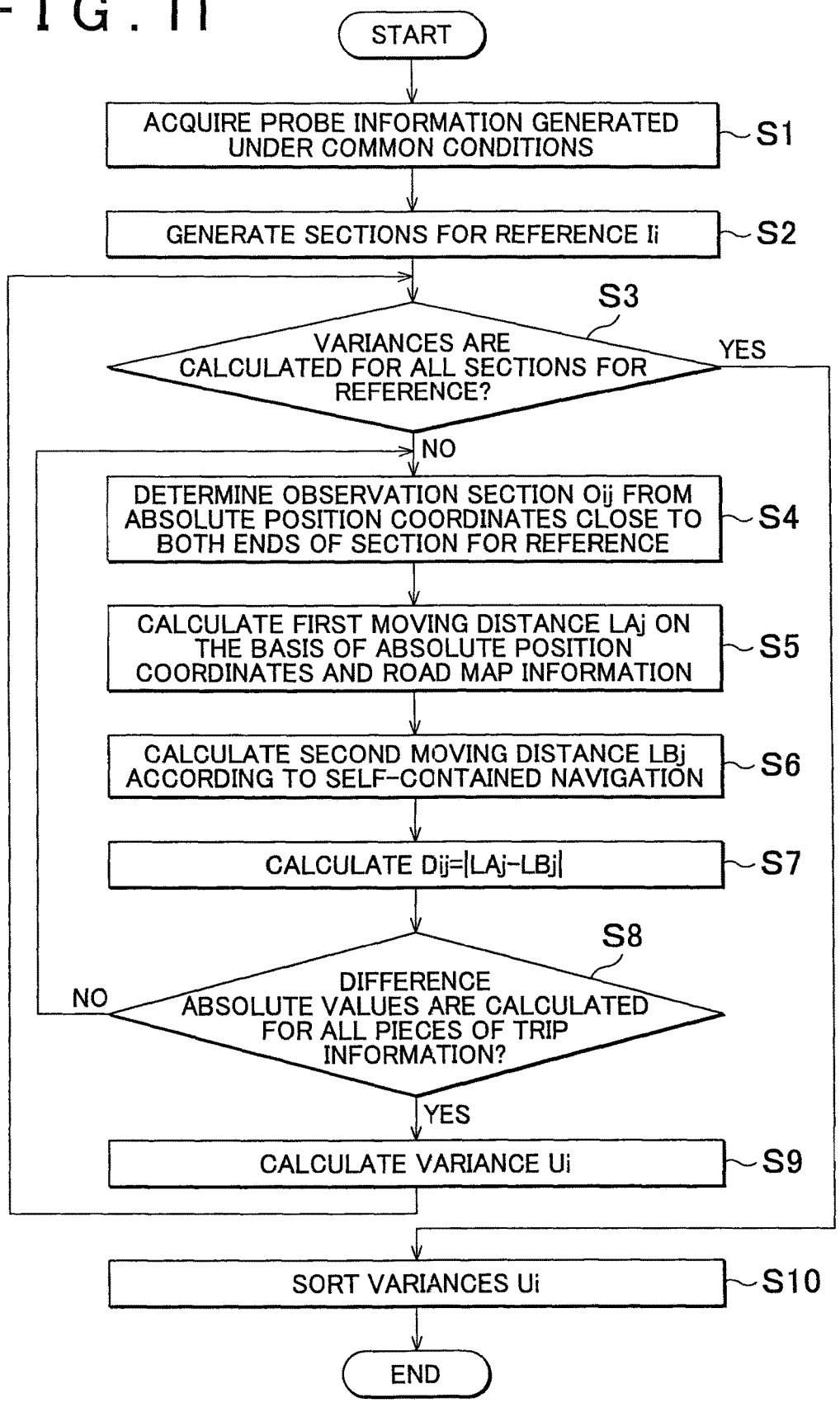
FIG. 11 is a flowchart for explaining a procedure of the offline processing performed by the position identifying apparatus.

The offline processing performed by the position identifying apparatus 11 is explained, together with the operation of the position identifying apparatus 11 with reference to FIG. 11. The trip extracting unit 22 of the position identifying apparatus 11 acquires, from the probe information storing unit 21, the probe information Prb transmitted under common conditions in a road section set as a target of identification of a vehicle position (step S1). As explained above, the common conditions include the probe information Prb generated in a predetermined traveling area of an expressway or a trunk road and the probe information Prb generated in a specific period of time in the predetermined traveling area. When acquiring the probe information Prb, the trip extracting unit 22 generates the trip information Trp in which the probe information Prb continuously transmitted from one vehicle 100 are arranged in time series.

When the trip information Trp is generated, the section-for-reference generating unit 23 sets the common section Tz for the trip information Trp and divides the common section Tz into a single section or a plurality of sections to generate the sections for reference Ii (step S2). Note that, as explained above, the section-for-reference generating unit 23 sets the sections for reference Ii not to exceed the maximum length Lmax.

When the sections for reference Ii are generated, the variance calculating unit 26 determines whether the variance Ui is calculated for all the sections for reference Ii included in the common section Tz (step S3). In this case, the variance calculating unit 26 performs the determination by, for example, comparing the number of the sections for reference Ii set in step S2 and the number of the sections for reference Ii for which the variance Ui is already calculated.

When it is determined that the calculation of the variance Ui is not completed for all the sections for reference Ii (NO in step S3), the first distance calculating unit 24 determines the section for reference Ii set as a target of the calculation of the variance Ui. Among the pieces of trip information Trpj (Trp1, Trp2, . . . , and Trpn) including the section for reference Ii, the first distance calculating unit 24 selects the trip information Trp to be set as a target for which the difference absolute value Dij is calculated. The first distance calculating unit 24 acquires, among the pieces of trip information Trpj, the absolute position coordinate information Prb2 corresponding to the section for reference Ii and reads the absolute position coordinate Pij based on the absolute position coordinate information Prb2. The first distance calculating unit 24 reads coordinates of the absolute position coordinates Pij1 and Pijm close to both ends of the section for reference Ii and determines an observation section Oij (step S4).

After determining the observation section Oij for the trip information Trpj, the first distance calculating unit 24 matches the absolute position coordinates Pij1 and Pijm of the trip information Trpj with positions on the road using the road map information 29. The first distance calculating unit 24 calculates, using the road map information 29, a distance along a road shape between the absolute position coordinates Pij1 and Pijm as the first distance LAj (step S5).

The second distance calculating unit 25 reads a value of the vehicle speed information Prb3 included in the probe information Prb included in the trip information Trpj and calculates the second distance LBj based on a vehicle integrated value obtained by integrating the vehicle speed V with time (step S6). Note that the order of the calculation by the first distance calculating unit 24 and the calculation by the second distance calculating unit 25 may be any order.

The variance calculating unit 26 reads the first distance LAj from the first distance calculating unit 24 and reads the second distance LBj from the second distance calculating unit 25. The variance calculating unit 26 calculates the difference absolute value Dij between the first distance LAj and the second distance LBj (step S7).

The variance calculating unit 26 determines whether the difference absolute value Dij is calculated for all the pieces of trip information Trpj including the section for reference Ii (step S8). When the variance calculating unit 26 determines that the difference absolute value Dij of the section for reference Ii is not calculated for all the pieces of trip information Trpj including the section for reference Ii (No in step S8), the processing returns to step S4. The variance calculating unit 26 selects the trip information Trpj to be set as a calculation target next. Steps S4 to S7 are repeated. When the variance calculating unit 26 determines that the difference absolute value Dij of the section for reference Ii is calculated concerning all the pieces of trip information Trpj including the section for reference Ii (YES in step S8), the processing proceeds to step S9.

When the difference absolute value Dij is calculated for all the trip information Trpj including the section for reference Ii, the variance calculating unit 26 calculates the variance Ui of the difference absolute value Dij concerning the section for reference Ii using the difference absolute value Dij calculated for each piece of the trip information Trp including the section for reference Ii (step S8). The processing returns to step S3. The variance calculating unit 26 selects the next section for reference Ii as a calculation target of the variance Ui. Steps S3 to S9 are repeated for the section for reference Ii. Consequently, the variance Ui is calculated as the variance U1 of the section for reference I1, the variance U2 of the section for reference I2, and the like.

When determining that the first distance calculating unit 24 and the second distance calculating unit 25 calculate the variances Ui for all the sections for reference Ii (YES in step S3), the variance calculating unit 26 ranks the sections for reference Ii in order from the section for reference Ii having the smallest variance Ui (step S9). The offline processing is ended. When assist is performed, the offline processing is performed in advance concerning a section for which assist information is generated.

Figure 12:
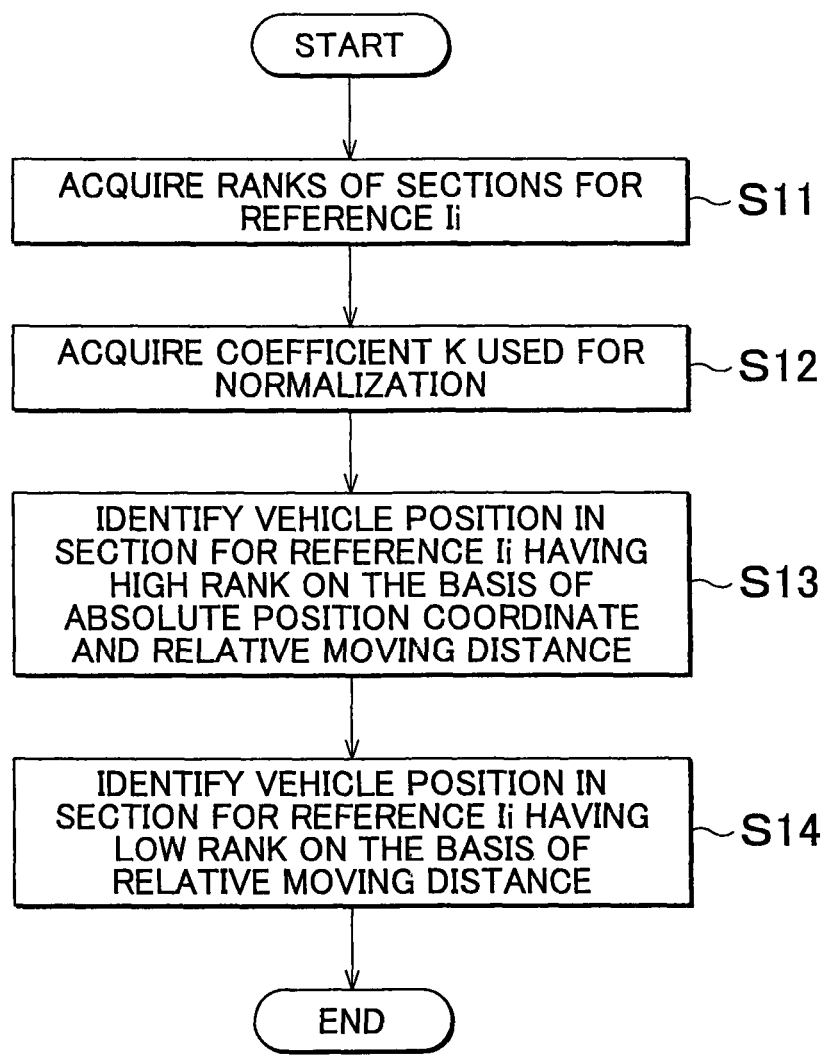
FIG. 12 is a flowchart for explaining a procedure of identification of the vehicle position performed by the position identifying apparatus.

Identification of a vehicle position using the ranking obtained by the offline processing is explained together with the operation of the position identifying apparatus 11 with reference to FIG. 12. Note that, in this embodiment, the identification of a vehicle position is also performed offline.

First, the position identifying unit 27 determines an area where identification of a vehicle position is performed and acquires ranks of the sections for reference Ii included in the area (step S10). When the sections for reference Ii are determined, the position identifying unit 27 acquires the ratio K used for normalization of the relative moving distance Δd in the sections for reference Ii (step S11). The ratio K may be calculated in advance or may be calculated after the section for reference Ii to be set as a target for which the identification of a vehicle position is performed is determined. As explained above, in this case, the position identifying unit 27 calculates, in any section in the sections for reference Ii, the theoretical distance Lmp along the road shape calculated on the basis of the road map information 29 and the relative moving distance Lv based on an integrated value of the vehicle speed information Prb3 included in the trip information Trpj. The vehicle position identifying unit 27 calculates, for each piece of the trip information Trpj, the ratio kj of the theoretical distance Lmp and the relative moving distance Lv (=Lmp/Lv). The vehicle position identifying unit 27 calculates the ratio K set as a reference using the ratios kj.

Further, for the section for reference Ii having a high rank, that is, a small variance UI and high positioning accuracy of an absolute position coordinate, the position identifying unit 27 identifies a vehicle position in the section for reference Ii using the absolute position coordinate and the relative moving distance Δd' (step S12). In this case, as explained above, the position identifying unit 27 acquires absolute position coordinates close to both ends of the section for reference Ii among absolute position coordinates included in the probe information Prb transmitted from one vehicle in the section for reference Ii. The position identifying unit 27 identifies a vehicle position using the relative moving distance Δd' obtained by normalizing positions of the absolute position coordinates by multiplying the relative moving distance Δd based on the vehicle speed integrated value by the ratio K. In this case, the position identifying unit 27 may use the direction information Prb4 included in the probe information Prb or may compare a traveling track calculated from the relative moving distance Δd and a change amount of a direction and the road shape based on the road map information 29 and perform matching.

The position identifying unit 27 identifies, using the relative moving distance Δd, a vehicle position in the section for reference Ii having a low rank, that is, a large variance Ui and low positioning accuracy of the GPS among the sections for reference Ii included in a section set as a target of identification of a vehicle position (step S13).

When there is a section in which positioning accuracy of an absolute position coordinate detected by the vehicle 100 is low, it is possible to improve identification accuracy of the vehicle position identified in the section for reference Ii in this way by excluding absolute position coordinate information in the section and calculating the vehicle position. In a section in which accuracy of an absolute position coordinate detected by the vehicle 100 is relatively large, since the normalized relative moving distance Δd' is used, it is also possible to reduce the influence of a cumulative error of the self-contained navigation. The probe information Prb for which the vehicle position is identified is stored in the position identification information storing unit 30 as the position identified information 31.

The assist information generating unit 32 further performs an analysis of a driving history, a traveling history, or the like and generates assist information according to necessity using the position identified information 31 and transmits the assist information to the vehicle 100, which travels in an assist target area, via the communication unit 20. In this case, accuracy of the vehicle position of the position identified information 31, which is original data of the assist information, is improved. Therefore, it is possible to transmit, for example, accurate information including a correct event occurrence position to the vehicle 100 that travels in the assist target area. If the identification of a vehicle position explained above is applied to the vehicle 100 that travels in the assist target area and transmits the probe information Prb, it is possible to determine timing when the vehicle 100 reaches a point where guidance or the like is necessary. Therefore, it is possible to transmit the information at accurate timing.

As explained above, with the vehicle position identifying system and the vehicle position identifying method according to this embodiment, it is possible to obtain effects explained below. (1) The difference absolute value Dij between the first distance LAj based on the absolute position coordinate calculated by the radio navigation and the road map information 29 and the second distance LBj based on the vehicle speed integrated value fluctuates according to positioning accuracy of an absolute position coordinate based on the GPS. In an environment in which a radio wave reception state is not satisfactory such as among high-rise buildings or a mountainous area, the difference absolute value Dij tends to increase. Therefore, a method of identifying a vehicle position in the section for reference Ii is selected according to the variance Ui based on the difference absolute value Dij calculated for the section for reference Ii. That is, concerning the section for reference Ii in which the variance Ui is small, a method of identifying a vehicle position using absolute position coordinates of two points in the section for reference Ii and the relative moving, distance Δd is selected. Concerning the section for reference Ii in which the variance Ui is large, a method of identifying a vehicle position using the relative moving distance Δd is selected. Therefore, concerning at least a section in which a radio wave reception state of the GPS is bad, it is possible to exclude information that is a factor of an error of the vehicle position and perform identification of the vehicle position. Therefore, accuracy of the identified vehicle position is improved.

(2) In the section for reference E in which the variance Ui is small, that is, the section for reference Ii in which the positioning accuracy of the GPS is high, vehicle positions between absolute position coordinates are interpolated by the relative moving distance Δd based on the vehicle speed integrated value. In the calculation of the relative moving distance Δd using the vehicle speed integrated value, the relative moving distance Δd based on the vehicle speed integrated value is normalized by multiplying the vehicle speed integrated value by the ratio K of the distance based on the road map information 29 and the vehicle speed integrated value based on the accumulated probe information Prb. Therefore, even when a traveling track is different depending on a vehicle, for example, in the section for reference Ii corresponding to an area where a lane change is frequently performed or the section for reference Ii corresponding to the vicinity of an intersection, it is possible to reduce the influence of a cumulative error included in a relative position coordinate.

(3) Concerning the section for reference Ii in which the variance Ui is small, among the absolute position coordinates Pij detected at the points in the section for reference Ii, the absolute position coordinates Pij closest to the ends on both the sides of the section for reference Ii are selected. Vehicle positions between the absolute position coordinates Pij are interpolated on the basis of the normalized relative moving distance Δd'. That is, since most areas in the section for reference Ii are interpolated by the normalized relative moving distance Δd', depending on setting of the length of the section for reference Ii, it is possible to reduce the influence of an absolute position coordinate having a relatively large error.

(4) According to the trip information Trp including the plurality of pieces of probe information Prb, the difference absolute value Dij between the first distance LAj and the second distance LBj is calculated for each piece of the trip information Trp. The variance Ui is calculated using all the difference absolute values Dij. For the section for reference Ii in which the variance Ui is small, identification of a vehicle position using an absolute position coordinate based on the radio navigation is performed. Therefore, it is possible to reduce the influence of an error due to a vehicle factor and an error due to, for example, a temporary failure of a radio reception state.

(5) The maximum length Lmax of the section for reference Ii is set to a value obtained by dividing the diameter $2\epsilon$ in the measurement error range of the radio navigation by the error a per unit length of the relative moving distance based on vehicle speed. That is, even when a vehicle position in the section for reference Ii is identified by only the relative moving distance, a cumulative error at that point does not exceed the positioning error range of the GPS. That is, in one section for reference Ii, an error of the position of the vehicle identified using only the relative moving distance based on the vehicle speed integrated value can be set smaller than an error of the position of the vehicle identified by only the radio navigation. Therefore, when a positioning error of the radio navigation is bad, it is possible to reduce an error of a vehicle position by identifying the position of the vehicle using only the vehicle speed integrated value.

(6) In the section for reference Ii in which the variance Ui is large, a vehicle position is calculated according to only the relative moving distance Δd based on the vehicle speed integrated value. Therefore, when measurement accuracy of an absolute position coordinate is low, it is possible to exclude information that is a factor of an error of the vehicle position and perform identification of the vehicle position. Therefore, accuracy of the identified vehicle position is improved compared with when the vehicle position is identified using at least the absolute position coordinate.

(7) The first distance LAj is calculated by the first distance calculating unit 24 on the basis of the road shape included in the road map information 29 along the road shape. Therefore, it is possible to set the first distance LAj close to an actual distance.

(8) The trip extracting unit 22, the section-for-reference generating unit 23, the first distance calculating unit 24, the second distance calculating unit 25, and the position identifying unit 27 are provided in the position identifying apparatus 11 that configures the probe car system and collects the probe information Prb. That is, the position of the vehicle traveling on the road can be identified by the information collecting apparatus using the method explained above. Therefore, it is possible to generate accurate traffic guidance information and the like using a large-scale apparatus group.

(Second Embodiment)

Differences of a second embodiment of the vehicle position identifying system and the vehicle position identifying method from the first embodiment are mainly explained below. Note that the basic configuration of the vehicle position identifying system according to this embodiment is the same as the basic configuration in the first embodiment. In the figures, components substantially the same as the components in the first embodiment are respectively denoted by the same reference numerals and signs. Redundant explanation of the components is omitted.

In this embodiment, the vehicle position identifying system is explained as a system mounted on a vehicle. The vehicle position identifying system collects traveling history information of traveling of a host vehicle and identifies the present position of the host vehicle on the basis of accumulated traveling history information in the past.

Figure 13:
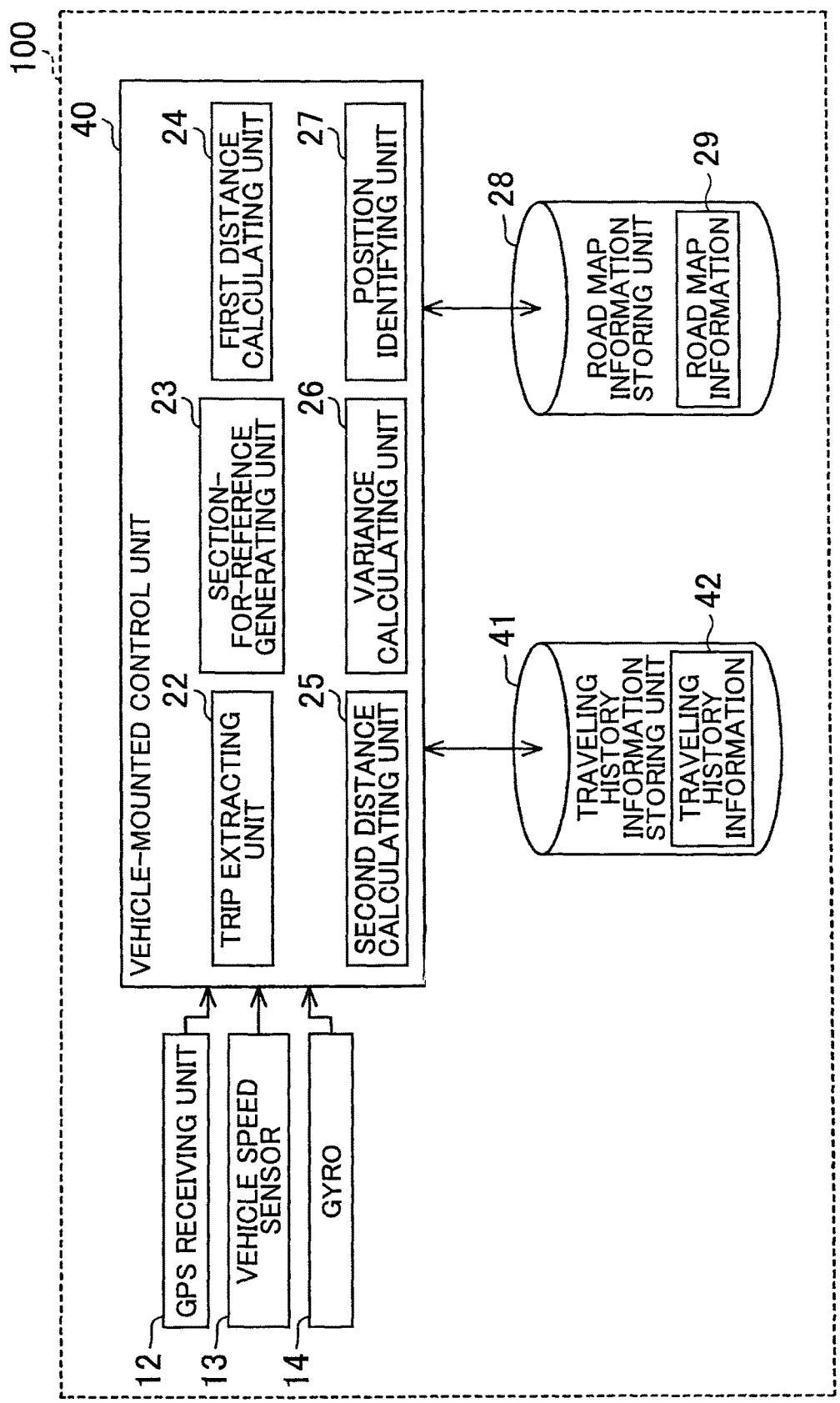
FIG. 13 is a block diagram showing, concerning a second embodiment of the vehicle identifying system and the vehicle identifying method according to the invention, the schematic configuration of a vehicle that configures a vehicle identifying system.

As shown in FIG. 13, the vehicle position identifying system includes the GPS receiving unit 12, the vehicle speed sensor 13, and the gyro 14 as in the first embodiment. The vehicle position identifying system includes a vehicle-mounted control unit 40 and the road map information storing unit 28. The vehicle-mounted control unit 40 includes the trip extracting unit 22, the section-for-reference generating unit 23, the first distance calculating unit 24, the second distance calculating unit 25, the variance calculating unit 26, and the position identifying unit 27. The vehicle position identifying system includes a traveling history information storing unit 41 equivalent to the probe information storing unit 21 in FIG. 1. In the traveling history information storing unit 41, traveling history information 42 concerning a route on which the host vehicle travels is stored.

When traveling history information is accumulated by a number at least necessary for statistics, the vehicle-mounted control unit 40 performs pre-processing for identification of a vehicle position as in the first embodiment. In this case, the traveling history information 42 generated at different timings by the host vehicle is treated like the probe information Prb in the first embodiment.

As in the first embodiment, after the ranking of the sections for reference Ii is performed, when the host vehicle travels in the ranked sections for reference Ii, in the section for reference Ii having a high rank, the position of the host vehicle is identified on the basis of an absolute position coordinate calculated by the radio navigation and a relative position coordinate calculated by the self-contained navigation. In the section for reference Ii having a low rank, the position of the host vehicle is identified on the basis of the relative position coordinate calculated by the self-contained navigation.

As explained above, with the vehicle position identifying system and the vehicle position identifying method according to this embodiment, besides the effects (1) to (7) explained above, effects explained below can be obtained.

(9) Since the trip extracting unit 22, the section-for-reference generating unit 23, the first distance calculating unit 24, the second distance calculating unit 25, the variance calculating unit 26, and the position identifying unit 27 are provided in the vehicle 100, it is possible to improve the accuracy of identification of a vehicle position concerning a section in which the host vehicle traveled in the past.

(Other Embodiments)

Note that the embodiments can also be carried out in forms explained below. As shown in FIG. 14, the probe information Prb may include a satellite position Prb6 of a GPS satellite. In this case, when the probe information Prb generated under common conditions is acquired, if a condition that the position of the GPS satellite is common is added to the conditions, fluctuation in positioning accuracy of an absolute position coordinate based on the GPS among the pieces of probe information Prb is suppressed.

In the embodiments, the position identifying apparatus 11 calculates the relative moving distance Δd on the basis of the vehicle speed information Prb3 included in the probe information Prb. However, a moving distance calculated by the vehicle-mounted control unit 15 or a relative position coordinate calculated on the basis of the speed and direction of the vehicle may be included in the probe information Prb.

When the position of the vehicle is identified using the relative moving distance Δd, a relative moving position with respect to the immediately preceding identified position may be identified using the direction information Prb4 included in the probe information Prb besides the vehicle speed.

In the position identifying system, the position identifying unit 27 may be provided in the vehicle 100. That is, a server may perform ranking of the sections for reference Ii. The vehicle 100 may receive the ranks and information concerning road sections associated with the ranks from the server and identify the position of the host vehicle.

The position identifying unit 27 performs, on the basis of the ranking using the trip information Trp generated in the offline processing, using the same trip information Trp, identification of the position of a vehicle that transmits the trip information Trp. However, the position identifying unit 27 may use the probe information Prb or the trip information Trp other than the trip information Trp. For example, the position identifying unit 27 may perform identification of a vehicle position with respect to the probe information Prb or the trip information Trp different from the trip information Trp used in the offline processing. For example, for the ranking, a predetermined number or more pieces of the probe information Prb accumulated in the probe information storing unit 21 may be used. A target of identification of a vehicle position may be the vehicle 100 that is a transmission source of the probe information Prb received anew.

In the embodiments, the difference absolute value Dij is calculated for each piece of the trip information Trpj. The variances Ui of the difference absolute values Dij are calculated and ranked. However, ranking may be performed on the basis of an average or the like of the difference absolute values Dij.

In the embodiment, concerning the section for reference Ii having the small variance Ui; the absolute position coordinates closest to both the ends of the section for reference Ii are calculated. The absolute position coordinates are interpolated by the relative moving distance Δd. However, absolute position coordinates to be set only have to be at least two points in the section for reference Ii.

In the embodiments, concerning the section for reference Ii having the small variance Ui, the vehicle position is identified using the absolute position coordinate and the normalized relative moving distance Δd'. However, for example, when data are few and normalization cannot be performed, the normalization does not need to be always performed. The relative moving distance Δd not normalized may be used.

In the embodiments, the position identified information 31 is used for the generation of the assist information. However, the identified vehicle position may be used for other purposes such as a grasp of the behavior of the vehicle. In the embodiments, when the variance Ui is small, the identification of a vehicle position using the absolute position coordinate and the relative moving distance is performed. When the variance Ui is large, the identification of a vehicle position using only the relative moving distance is performed. However, a vehicle position may be identified by other methods. For example, when the variance Ui is small, the identification of a vehicle position may be performed using only absolute position coordinates in the section for reference Ii. In this case, for example, the absolute position coordinates may be mapped on a road on the basis of the road map information 29 and, assuming that the vehicle travels at fixed speed among the absolute position coordinates, a vehicle position may be identified on the basis of the time information Prb5 of the probe information Prb. Alternatively, a function or the like passing the absolute position coordinates may be generated to identify a vehicle position. When the variance Ui is large and when the variance Ui of the adjacent immediately preceding section for reference Ii is also large, a vehicle position is continuously identified on the basis of the relative moving distance. Therefore, for example, only one absolute position coordinate may be used in an interpolating manner. In this case, it is preferable to map the absolute position coordinate on the road by comparing a traveling track based on the relative moving distance and a change amount of a direction and the road map information 29.

In the first embodiment, the GPS receiving unit 12, the vehicle speed sensor 13, the gyro 14, the vehicle-mounted control unit 15, and the vehicle-mounted communication unit 16 are mounted on the vehicle 100. The probe information Prb is transmitted from the vehicle. However, the probe information Prb may be transmitted from a portable information terminal such as a smart phone used in the vehicle. In this case, the portable information terminal includes a GPS receiving unit, a speed sensor or an acceleration sensor, a direction sensor, a communication unit, and a control unit that functions equivalently to the vehicle-mounted control unit 15.

The invention claimed is:

1. A vehicle position identifying system that identifies a position of a vehicle using an absolute position coordinate based on radio navigation and a relative position coordinate based on at least vehicle speed, the vehicle position identifying system comprising:
    a history information acquiring unit that acquires traveling history information including the absolute position coordinate and the vehicle speed from the vehicle;
    a section-for-reference generating unit that sets, for the acquired traveling history information, a section for reference in which a traveling area is common;
    a first distance calculating unit that reads two absolute position coordinates concerning a same vehicle that are transmitted at different points in the section for reference, and calculates a distance between the two absolute position coordinates as a first distance on the basis of road map information;
    a second distance calculating unit that reads the two absolute position coordinates and calculates the distance between the two absolute position coordinates as a second distance on the basis of the vehicle speed included in the traveling history information; and
    a position identifying unit that selectively performs, according to an absolute value of a difference between the first distance and the second distance, one of identification of the vehicle position using the absolute position coordinate based on the radio navigation, identification of the vehicle position using a vehicle speed integrated value, and identification of the vehicle position using both of the absolute position coordinate based on the radio navigation and the vehicle speed integrated value.

2. The vehicle position identifying system according to claim 1, wherein,
    in the identification of the vehicle position using both of the absolute position coordinate based on the radio navigation and the vehicle speed integrated value, concerning the section for reference in which the absolute value of the difference between the first distance and the second distance is small, the position identifying unit calculates a ratio of a vehicle speed integrated value calculated on the basis of the acquired traveling history information concerning at least a part of road sections in the section for reference and a distance calculated from the road map information concerning the road section, multiplies a vehicle speed integrated value based on the traveling history information of a position identification target by the calculated ratio, and identifies a vehicle position between the two absolute position coordinates.

3. The vehicle position identifying system according to claim 2, wherein
the position identifying unit identifies the position of the vehicle by selecting, among absolute position coordinates detected at points in the section for reference in which the absolute value of the difference between the first distance and the second distance is small, absolute position coordinates closest to ends on both sides of the section for reference, and interpolating the absolute position coordinates with a relative moving distance obtained by multiplying the vehicle speed integrated value by the ratio.

4. The vehicle position identifying system according to claim 1, further comprising
a variance calculating unit that calculates, for each piece of the acquired traveling history information, the absolute value of the difference between the first distance and the second distance, and calculates, using absolute values of the differences respectively calculated from the acquired traveling history information, variance of the absolute values, wherein
the position of the vehicle is identified using at least the absolute position coordinate concerning the section for reference in which the variance is small.

5. The vehicle position identifying system according to claims 1, wherein
the section-for-reference generating unit sets a length of the section for reference to a length at which a distance including a cumulative error obtained when position identification is performed only by a relative moving distance based on the vehicle speed integrated value is within a positioning error range on a positioning system side using the radio navigation.

6. The vehicle position identifying system according to claims 1, wherein,
concerning the section for reference in which the absolute value of the difference between the first distance and the second distance is large, the position identifying unit identifies the vehicle position using only a relative moving distance based on the vehicle speed integrated value.

7. The vehicle position identifying system according to claim 1, wherein
the first distance calculating unit selects, among absolute position coordinates detected at points in the section for reference, absolute position coordinates closest to ends on both sides of the section for reference, matches the selected absolute position coordinates with positions on a road on the basis of the road map information, and calculates a distance between the matched positions as the first distance along a road shape included in the road map information.

8. The vehicle position identifying system according to claim 1, wherein
the history information acquiring unit, the section-for-reference generating unit, the first distance calculating unit, the second distance calculating unit, and the position identifying unit are provided in an information collecting apparatus that configures a probe car system and collects probe information.

9. A vehicle position identifying method for identifying a position of a vehicle using an absolute position coordinate based on radio navigation and a relative position coordinate based on at least vehicle speed, the vehicle position identifying method comprising:
acquiring traveling history information including the absolute position coordinate and the vehicle speed from the vehicle;
setting, for the acquired traveling history information, sections for reference in which a traveling area is common;
reading two absolute position coordinates concerning a same vehicle that are transmitted at different points in the section for reference, and calculating a distance between the two absolute position coordinates as a first distance on the basis of road map information;
reading the two absolute position coordinates and calculating the distance between the two absolute position coordinates as a second distance on the basis of the vehicle speed included in the traveling history information; and
selectively performing, according to an absolute value of a difference between the first distance and the second distance, one of identification of the vehicle position using the absolute position coordinate based on the radio navigation, identification of the vehicle position using a vehicle speed integrated value, and identification of the vehicle position using both of the absolute position coordinate based on the radio navigation and the vehicle speed integrated value.

* * * * *